United States Patent
Sanderovich

(10) Patent No.: US 9,614,700 B2
(45) Date of Patent: Apr. 4, 2017

(54) TECHNIQUES FOR CHANNEL ESTIMATION IN MILLIMETER-WAVE COMMUNICATION SYSTEMS

(71) Applicant: QUALCOMM INCORPORATED, San Diego, CA (US)

(72) Inventor: Amichai Sanderovich, Haifa (IL)

(73) Assignee: Qualcomm Incorporated, San Diego, CA (US)

( * ) Notice: Subject to any disclaimer, the term of this patent is extended or adjusted under 35 U.S.C. 154(b) by 552 days.

(21) Appl. No.: 14/145,150

(22) Filed: Dec. 31, 2013

(65) Prior Publication Data

US 2016/0218890 A1  Jul. 28, 2016

Related U.S. Application Data

(60) Provisional application No. 61/748,324, filed on Jan. 2, 2013.

(51) Int. Cl.
| | |
|---|---|
| *H04L 25/03* | (2006.01) |
| *H04J 13/00* | (2011.01) |
| *H04L 25/02* | (2006.01) |

(52) U.S. Cl.
CPC .... *H04L 25/03305* (2013.01); *H04J 13/0014* (2013.01); *H04L 25/0258* (2013.01)

(58) Field of Classification Search
CPC .......... H04L 25/03305; H04L 25/0258; H04B 1/7097; H04B 2201/709718; H04J 13/0014
See application file for complete search history.

(56) References Cited

U.S. PATENT DOCUMENTS

| | | | |
|---|---|---|---|
| 8,509,709 B2 | 8/2013 | Rettig et al. | |
| 2005/0238086 A1* | 10/2005 | Kokubo | H04L 1/20 375/148 |
| 2005/0286615 A1* | 12/2005 | Wang | H04B 7/0854 375/150 |
| 2006/0227748 A1* | 10/2006 | Stamoulis | H04L 25/0204 370/332 |

(Continued)

OTHER PUBLICATIONS

Ming Lei et al., "CFR and SNR Estimation Based on Complementary Golay Sequences for Single-Carrier Block Transmission in 60GHz WPAN"; Wireless Communications and Networking Conference; Apr. 5, 2009; pp. 1-5.

(Continued)

*Primary Examiner* — Syed Haider

(57) ABSTRACT

Disclosed is an apparatus, computer implemented method and method for preforming channel estimation in a millimeter wave wireless communication system which includes receiving complementary sequences at a receiver of the millimeter wave wireless communication system; estimating a channel estimation of a channel among the received complementary sequences; estimating a signal-to-noise ratio (SNR) estimation of the channel; detecting a maximum channel response value of the channel estimation; computing a de-noised threshold value from the maximum channel response value and the SNR estimation of the channel; comparing the de-noised threshold value to the channel estimation to detect a last valid tap of a channel impulse response; and zeroing out all the taps after the detected last valid tap of the channel impulse response.

11 Claims, 3 Drawing Sheets

(56) References Cited

U.S. PATENT DOCUMENTS

| | | | | |
|---|---|---|---|---|
| 2007/0002980 A1* | 1/2007 | Krupka | ............... | H04B 17/336 |
| | | | | 375/346 |
| 2010/0080266 A1* | 4/2010 | Zhang | .................. | H04J 13/102 |
| | | | | 375/140 |
| 2011/0206169 A1* | 8/2011 | Guo | ...................... | H04L 25/024 |
| | | | | 375/346 |
| 2013/0176991 A1* | 7/2013 | Yi | ........................ | H04J 11/0076 |
| | | | | 370/336 |
| 2014/0071892 A1* | 3/2014 | Liu | ........................ | H04W 8/00 |
| | | | | 370/328 |

OTHER PUBLICATIONS

Henrik Schober, "Delay Spread Estimation for OFDM Based Mobile Communication Systems"; Proceedings of the Eighth IEEE International Symposium on Computers and Communication; 2003; pp. 1-4.

IEEE Standards Association, "IEEE Std 802.11ad-2012: Part 11: Wireless LAN Medium Access Control (MAC) and Physical Layer (PHY) Specifications—Amendment 3: Enhancements for Very High Throughput in the 60 GHz Band"; Dec. 28, 2012; pp. 277-281, 487-491, 461-464, 472, 473, 475, 476, 479.

* cited by examiner

TECHNIQUES FOR CHANNEL ESTIMATION IN MILLIMETER-WAVE COMMUNICATION SYSTEMS

CROSS REFERENCE TO RELATED APPLICATION

The application claims the benefit of U.S. Provisional Application No. 61/748,324, filed Jan. 2, 2013, the contents of which are incorporated herein by reference.

TECHNICAL FIELD

The present invention relates generally to techniques for channel estimation in a millimeter-wave wireless communication system and, more particularity, to techniques for further enhancing channel estimation using signal-to-noise estimations.

BACKGROUND

The 60 GHz band is an unlicensed band which features a large amount of bandwidth and a large worldwide overlap. The large bandwidth means that a very high volume of information can be transmitted wirelessly. As a result, multiple applications that require transmission of a large amount of data can be developed to allow wireless communication around the 60 GHz band. Examples of such applications include, but are not limited to, wireless high definition TV (HDTV), wireless docking stations, wireless Gigabit Ethernet, and many others. Wireless local area network (WLAN) standards, such as WiGig Alliance (WGA) and IEEE 802.11ad, are being developed to serve applications that utilize the 60 GHz spectrum.

Such communication standards enable wireless transmission between two stations that are a short distance from each other. Typically, in such wireless transmission systems, signals circulate between transmitters and receivers by way of channels. Due to many factors in channel characteristics, an unwanted distortion is induced in the signal transmitted by the transmitter. Accordingly, it is generally necessary to determine the characteristics of a channel at a given moment in order to estimate the induced distortion in the transmitted signal.

There are a number of techniques for performing channel estimation in wireless transmission systems. For example, one technique includes transmitting signals with predetermined sequences via a transmitter and then comparing the signals received in a receiver using auto-correlation and cross-correlation with expected signals in order to estimate the characteristics of the channel. The sequences of the transmitted signals are known to the receiver. The results of the correlation operation constitute the estimate of the impulse response of the channel.

In millimeter-wave wireless transmission systems operating in the 60 GHz band, for example, as defined by the IEEE 802.11ad standard published Dec. 28, 2012 (hereinafter the IEEE 802.11ad standard), a preamble is employed as part of each physical layer convergence procedure (PLOP) protocol data unit (PPDU) used for channel estimation. The preamble is commonly used for both orthogonal frequency-division multiplexing (OFDM) packets and single carrier (SC) Packets.

As shown in FIG. 1, an IEEE 802.11ad preamble 100 is composed of two parts, a short training field (STF) 120 and a channel estimation field (CEF) 130. Both the STF 120 and CEF 130 fields contain Golay complementary sequences, which are transmitted by a transmitter and are auto-correlated by a receiver in a millimeter-wave wireless transmission system. Typical Golay complementary sequences have many advantageous properties, such as producing a perfect sum of autocorrelations and providing efficient implementations requiring only $\log_2(N)$ additions for two complementary sequences of length N.

As shown in FIG. 1, the STF 120 is composed of 16 repetitions of the sequence $Ga_{128}(n)$ in length 128 followed by a single repetition of $-Ga_{128}(n)$. The CEF 130 is used for channel estimation, as well as for indicating which modulation is going to be used for the packet. The CEF 130 is composed of a concatenation of two sequences, $Gu_{512}(n)$ and $Gv_{512}(n)$, wherein the last 128 samples of $Gu_{512}(n)$ and $Gv_{512}(n)$ are equal to the last 128 samples used in the short training field (e.g., $-Ga_{128}(n)$). These sequences are followed by a 128 sample sequence, $Gv_{128}(n)$, equal to the first 128 samples of both $Gu_{512}(n)$ and $Gv_{512}(n)$ (e.g., $-Gb_{128}(n)$). In total, the CEF 130 includes a channel estimate of 1152 symbols while the STF 120 includes 2176 symbols.

The precision of the channel estimation at the receiver is determined by the signal-to-noise ratio (SNR) at the receiver. The SNR is an indicator often used to evaluate the quality of a communication link. For example, according to the IEEE 802.11ad standard, the SNR measured during the reception of a control PHY packet can be valued from −13 dB to 50.75 dB in 0.25 dB steps. As indicated above, the 802.11ad channel estimation sequence is 1152 symbols long, which yields an estimated channel of length 128, thereby resulting in a precision value of SNR+9 dB.

The resulting channel estimation is fed directly into an equalizer or into a frequency domain transform such as a fast Fourier transform (FFT) for further processing that does not improve the precision of the channel estimation. As alluded to above, the purpose of the channel estimation is to obtain high performance in the presence of a very dispersive channel with several echoes by using one or more equalizers to mitigate inter-symbol-interference (ISI) caused by the channel. In order for the equalizers to work properly, they require a good channel estimate that models the ISI effect as a linear filter response.

Hence, there is a need for a solution to enhance the channel estimation in a millimeter-wave wireless transmission system.

SUMMARY

Certain exemplary embodiments disclosed herein include a method and apparatus for performing channel estimation in a millimeter wave wireless communication system. The method includes receiving complementary sequences at a receiver of the millimeter wave wireless communication system; estimating a channel estimation of a channel among the received complementary sequences; estimating a signal-to-noise ratio (SNR) estimation of the channel; detecting a maximum channel response value of the channel estimation; computing a de-noised threshold value from the maximum channel response value and the SNR estimation of the channel; comparing the de-noised threshold value to the channel estimation to detect a last valid tap of a channel impulse response; and zeroing out all the taps after the detected last valid tap of the channel impulse response.

BRIEF DESCRIPTION OF THE DRAWINGS

Various embodiments are particularly pointed out and distinctly claimed in the claims at the conclusion of the specification. The foregoing and other objects, features, and advantages of various embodiments described herein will be apparent from the following detailed description taken in conjunction with the accompanying drawings.

DETAILED DESCRIPTION

Figure 1:
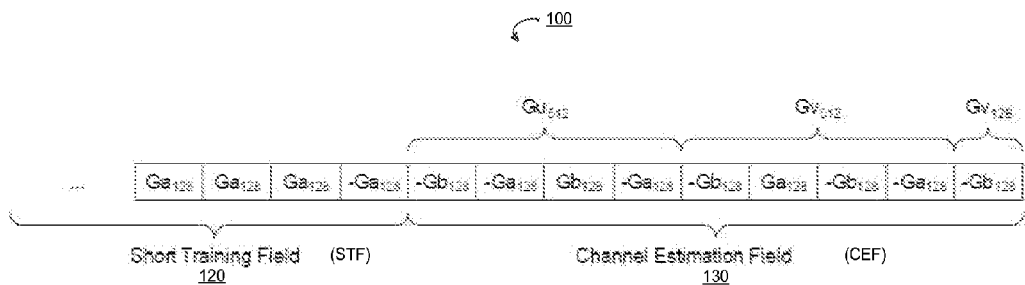
FIG. 1 is an illustration of an IEEE 802.11ad preamble.

The embodiments disclosed are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 2:
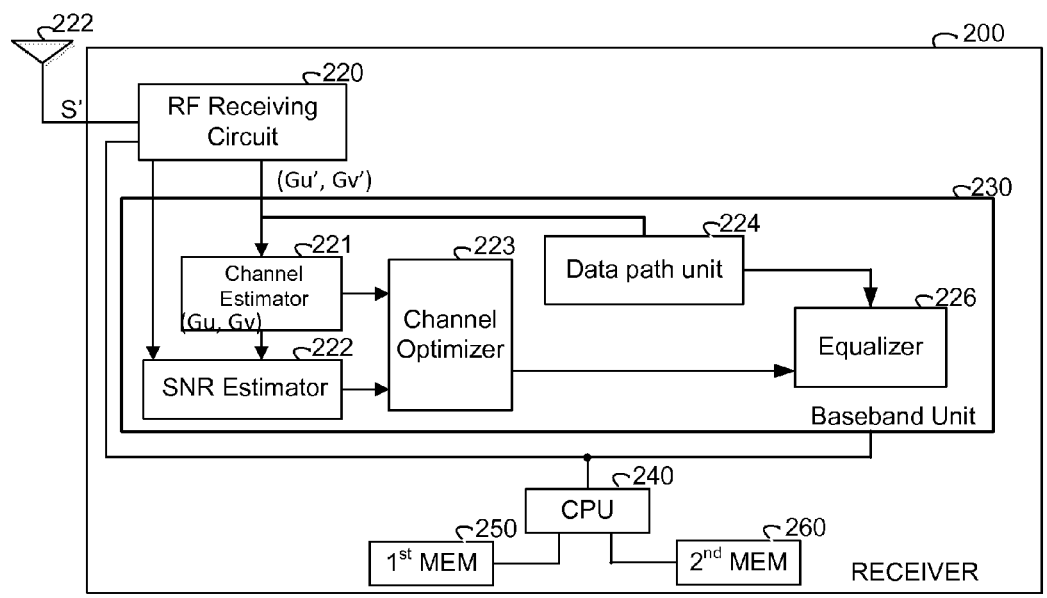
FIG. 2 is a block diagram of a millimeter-wave receiver suitable for carrying out the example embodiments disclosed herein.

FIG. 2 is a block diagram of a receiver 200 suitable for carrying out the disclosed embodiments. In particular, the receiver 200 is suitable for receiving signals transmitted by a transmitter over a millimeter-wave wireless transmission system operating at 60 GHz to support multi-gigabit wireless data transmission. That is, a signal, in the form of data packets, is propagated by a transmitter. For example, the signal may be propagated in the form of data packets as defined by the IEEE 802.11ad standard, and a preamble may be employed as part of each physical layer convergence procedure (PLOP) protocol data unit (PPDU) used for channel estimation, as shown in FIG. 1. The various exemplary embodiments support modulation transmission techniques, such as orthogonal frequency division multiplexing (OFDM) or single-carrier block transmission (SCBT) (e.g., single-carrier frequency-domain equalization (SC-FDE)).

As shown in FIG. 2, the receiver 200 includes a radio frequency (RF) receiving circuit 220 configured for receiving a signal from a transmitter (not shown) by way of an antenna 222 over a millimeter-wave wireless transmission system operating in the 60 GHz frequency band. The antenna (or antennas) 222 can be an array of active antennas configured to transmit/receive millimeter-wave signals. In an embodiment, the array of antennas is configured to receive and transmit wireless signals in the 60 GHZ frequency band suitable for carrying out communications in accordance with at least the IEEE 802.11ad standard. An active antenna can be controlled to receive/transmit radio signals in a certain direction, to perform beam forming, and to switch from receive mode to transmit mode. For example, the antennas may be a phased array antenna in which each radiating element can be controlled individually to enable the usage of beam-forming techniques. Other examples for antennas 222 may include a set of switched beam antennas, directional multi-gigabit (DMG) antennas, and the like. Alternatively, the active antennas 210 can be a triple band antenna suitable for receiving data transmission over the frequency bands of 2.4 GHz, 5 GHz, or 60 GHz.

The RF receiving circuit 220 can be configured to include, for example, various amplifiers, various mixers, one or more pulse filters or polyphase filters (not shown), an analog to digital (A/D) converter, a down sampler (not shown), and a guard interval remover (not shown) adapted for OFDM or SCBT modulation as known by those skilled in the art. In an exemplary implementation, the RF receiving circuit 220 can be disposed in an RF front-end as known in the art. It should be noted that in certain configurations, certain functions of the RF receiving circuit 220 can be implemented in the baseband unit 230. For example, polyphase filters and a (A/D) converter can be implemented in the baseband unit 230 prior to the channel estimation.

Signals S' including the sequences (G'u,G'v) are received at the receiver circuit 220. It should be noted that due to the channel conditions, the received sequences (G'u, G'v) may be different from the original sequences Gu, Gv included in signals output by the transmitter 200. In certain embodiments, the signals S' (including sequences G'u,G'v) are filtered using, e.g., a polyphase filter, to change the sampling rate of those signals to a rate employed by the channel estimator 221.

The received signals S', including the complementary sequences (G'u, G'v), are fed into the baseband unit 230 for further processing by way of acquisition and data processing algorithms. Specifically, the baseband unit 230 includes a channel estimator 221, a signal-to-noise ratio (SNR) estimator 222, and a channel optimizer 223 that are configured to improve the channel estimation according to the disclosed embodiments. The baseband unit 230 further includes a data-path unit 224 that performs conventional signal acquisition functions such as decimation, calibration, etc., as well as an equalizer 226 configured to equalize the received signals S' based on the output of the channel optimizer 223.

In one non-limiting exemplary embodiment, a channel estimator 221 is a Golay Correlator configured to cross-correlate the received complementary sequences (G'u, G'v) with preset complementary sequences (Gu, Gv). The complementary sequences (Gu, Gv) comprise a concatenation of two different complementary Golay sequences, each of which includes sequence values (elements) determined by a delay vector (D) and a weight vector (W). The vectors D and W each have K values. The number of elements (samples) N of the Golay sequence is 2K. An exemplary and non-limiting implementation of the channel estimator 221 can be found in a U.S. patent application Ser. No. 13/408,625 to Sanderovich, et al., which is assigned to common assignee, and is incorporated hereby by reference for all that it contains.

The SNR estimator 222 is configured to analyze and provide an estimate of the noise of the output of the RF receiving circuit 220, and the output of the channel estimator 221 is based upon detected noise and the delay spread. In one embodiment, the fact that most wireless channels have shorter delay spreads than the maximum potential delay spread is utilized to generate the output of the channel estimator. Accordingly, the SNR estimator 222 is configured to determine noise among the concatenation of two different complementary Golay sequences to generate a channel impulse response optimized for the detected noise. The SNR estimator 222 can be configured as a minimum mean-square error (MMSE) or least-squares (LS) channel estimator as known by those skilled in the art.

In one embodiment, the SNR estimator 222 is configured to estimate the noise by subtracting two subsequent preambles (e.g., subscription of the short training field) and averaging the estimation across a predefined number of received preambles. In another embodiment, the SNR estimator 222 is configured to estimate the noise based on the strength of the received signal and the estimated channel.

The output of both the channel estimator 221 and the SNR estimator 222 are fed into the channel optimizer 223 for further processing as described below in more detail with respect to FIG. 3 and described below with respect to the disclosed methods. Thereafter, the output of the channel optimizer 223 is fed into one or more equalizers, such as the equalizer 226, which is disposed in the baseband unit 230.

In an embodiment, the equalizer 226 is configured to receive signals output from the RF receiving circuit 220 by way of one or more in-phase/quadrature (IQ) buffers (not shown) which include the channel estimate output from the channel optimizer 223. The equalizer 226 is also configured to receive the original complementary sequence from the RF receiving circuit 220. The equalizer 226, in one embodiment, can be a minimum mean-square error (MMSE) equalizer employed to combat inter-symbol interference (ISI) caused by multipath fading, or the equalizer can employ zero forcing.

The output of the equalizer 226 can be output into one or more inverse Fast Fourier transform (IFFT) units (not shown) with the output subject to modulation de-mapping and channel decoding, as well as further processing by an electronic device that is coupled to the receiver 200.

Also shown in FIG. 2, receiver 200 may include one or more processors, such as a central processing unit (CPU) 240, a first computer-readable memory 250, which stores a plurality of parameters in random access memory (RAM) or read only memory (ROM) and a second computer memory 260 tangibly embodying a program of instructions executable and stored in in random access memory (RAM) or read only memory (ROM). The program of instructions stored in first computer-readable memory 250 and second computer-readable memory 260 are described below and shown in FIG. 4.

Figure 3:
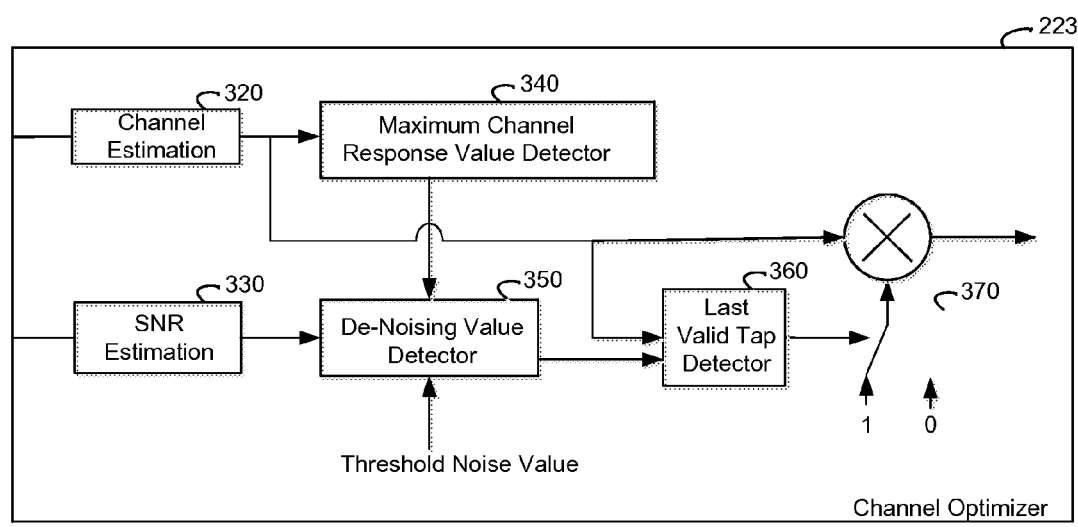
FIGS. 3 is a block diagram of a channel optimizer shown in FIG. 2 suitable for carrying out the example embodiments disclosed herein.

Referring now to FIG. 3, the channel optimizer 223 is now described in more detail in accordance with the disclosed exemplary embodiments. As shown in FIG. 3, the channel optimizer 223 receives inputs, such as one or more channel estimations 320 (provided by the channel estimator 221) and one or more corresponding SNR estimations of the channel 330 (provided by the SNR estimator 222). Each signal may optionally be subject to further signal processing as known by those skilled in the art. It should also be noted that FIG. 3 merely provides an exemplary implementation of the improved channel estimation in accordance with the disclosed embodiments with maximum tap of 1, and estimated SNR estimation of the channel of 9 dB in accordance with Equation No. 1 set forth below:

$$\max(i_{last}) \left| \text{abs}\left(h(i_{last})\right) > 1 \times 10^{\frac{SNR}{20}} * \text{Threshold} \right. \quad \text{(Equation No. 1)}$$

According to Equation No. 1, the maximum last tap value of the channel response, $\max(i_{last})$ is such that the absolute value of the channel response sequence h is subject to zeroing out all taps after the last tap value i. For example, in an example implementation, zeroing out the last value tap i can be implemented as follows:

$$h(i_{last+1}, \ldots, 128)=0$$

where, $i_{last}$ is the last valid tap, thereby zeroing out all taps after $i_{last}$.

As shown in FIG. 3, the channel optimizer 223 receives channel estimation, which represents an impulse response of the Golay complementary sequence received from a transmitter over the millimeter-wave transmission system operating in the 60 GHz frequency band. The optimizer 223 also receives the estimation of the SNR of the channel. As further shown in FIG. 3, a maximum response value detector 340 detects a maximum channel response value among the received complementary sequence (G'u, G'v). In one embodiment, the maximum channel response value detector 340 is configured to scan all the absolute values of the cross-correlation results. In another embodiment, the maximum channel response value is derived from the 802.11ad preambles transmitted during the STF (e.g., STF 120). In another embodiment, the detector 340 calculates the location of the maximum channel response value from the STF and the actual maximum value of the cross-correlation results.

The output of the maximum channel response value detector 340 is input into a de-noising value detector 350, which is configured to compute a de-noised threshold value. In one example embodiment, the de-noised threshold value is determined in accordance with Equation No. 2 set forth below:

$$\frac{\text{Max Channel Response Value}}{\text{SNR Estimation}} \times \text{Threshold Noise Value} \quad \text{(Equation No. 2)}$$

That is, according to Equation No. 2, the de-noising value detector 350 takes the output of the maximum channel response value detector 340 divides that value by the SNR estimation of the channel 330 and then multiplies the result by a threshold noise value, which is representative of a known additive Gaussian noise. The output of the de-noising value detector 350 is the de-noised threshold value.

In another embodiment, the de-noised threshold value is computed without the SNR estimation of the channel. Accordingly, the channel estimation 320 is multiplied by the SNR estimation of the channel 330, then the result is compared to the de-noised threshold value. In this embodiment, the de-noised value is set to:

$$\text{Max Channel Response Value} \times \text{Threshold Noise Value} \quad \text{(Equation No. 3)}$$

A last valid tap detector 360 is provided in the channel optimizer 223 and is configured for receiving the de-noised threshold value via the de-noising value detector 350 as well as for receiving the Golay complementary sequences by way of the channel estimation 320. The last valid tap detector 360 subjects these two inputs, the Golay complementary sequences and the de-noised threshold value, to a comparison operation. A result of the comparison is the zeroing out of all the taps after the last valid tap (e.g., the taps which are not bigger than the de-noised threshold value). The tap with a value that is equal to or less than that of the de-noised threshold value is considered to be the last valid tap. The zeroing operation is performed by a multiplier 370 which multiplies taps cross-correlation results by either '1' or '0'. That is, all taps which are not greater than the de-noised threshold value are multiplied by '0' and the rest by '1'.

The channel optimizer 223 takes advantage of the fact that most channels have shorter delay spreads than the maximum possible delay spread of a channel length of 128. As a resulting of the above described filter operation shown in FIG. 3, the last valid tap of the channel response is isolated as an output which reduces the amount of data subject to further processing by the equalizer 226, hence speeding up the signal processing of receiver 200 and improving its performance.

Each threshold noise value reflects the 1152 symbols in the channel estimation field of the preamble transmitted from a transmitter in the millimeter-wave transmission system over the 60 GHz frequency band.

In one particular embodiment, the threshold noise value utilized by the detector 350 can be set to the various channel behavioral limits in accordance with operating classes in various regions of the world. For example, the receiver 200 could be coupled to an electronic device which includes global positioning satellite (GPS) functionality by way of connection to a global navigation satellite system (GNSS). Accordingly, an electronic device could detect its location and set threshold noise values as well as maximal channel response values to reflect known characteristics of channel sets used in the United States, Europe, Japan, or other regions of the global to rule out wasteful searches for channels which are not in use in a particular region. For example, certain countries do not utilize certain channels; as such, the disclosed embodiments do not waste time searching for non-existent channels. Additionally, one embodiment allows easier detection of known additive Gaussian noise due to known seasonal precipitation in a region. Furthermore, threshold noise values can reflect whether receiver 200 is utilized indoors or outside. As such, the threshold noise values would be set lower or higher for either scenario to avoid a processing noise due to known external conditions. The external conditions can be monitored by a process executed by the processor 240 and the threshold value may be updated accordingly. In another exemplary embodiment, the receiver can receive updates on threshold noise values.

Some non-limiting examples of electronic devices suitable for coupling to receiver 200 are a computer by way of a PCI express bus or other connectivity bus standard such as a universal serial bus (USB), a serial advanced technology attachment (SATA) bus, and the like; similarly, an electronic device can be a laptop computer, a tablet computer, a personal digital assistant, a smartphone, a wearable computing device, a remote alarm terminal, a kiosk, a wireless modem, or a receiver 200, which can be implemented as part of a transceiver array in a user equipment (e.g., smart phone, tablet or laptop computer) to support WIFI backhaul support as standardized by the Third Generation Partnership Project (3GPP) Long Term Evolution-Advance (LTE-A) or Beyond (LTE-B) standard. Alternatively, receiver 200 can be implemented in a transceiver array of a First Responder wireless device in support of redundant WIFI backhaul network service for accessing a FirstNet Nationwide Network (FNN), or a receiver 200 can be coupled to any consumer electronic device seeking to support applications which operate in the 60 GHz frequency band, for example in compliance with the IEEE 802.11ad standard.

It should be noted that disclosed embodiments provide that the components of the RF front-end (e.g., RF receiving circuit 220 and baseband unit 230) may be closely co-located, such as in the one or more integrated circuits (ICs), in a single monistic IC, or cast on a printed circuit board (PCB). As such, the positioning of the RF front-end and baseband modules need not be closely co-located. This lack of need for co-location is ideal for modern electronic devices, which have small form factors. Alternatively, as discussed below with respect to the computer implemented embodiments, the disclosed embodiments can be tangibly embodied in one or more computer modules represented in computer instructions carried out by one or more computer processes by way of a microprocessor, microcontroller, digital signal processor (DSP), or field programmable gate array (FPGA).

Figure 4:
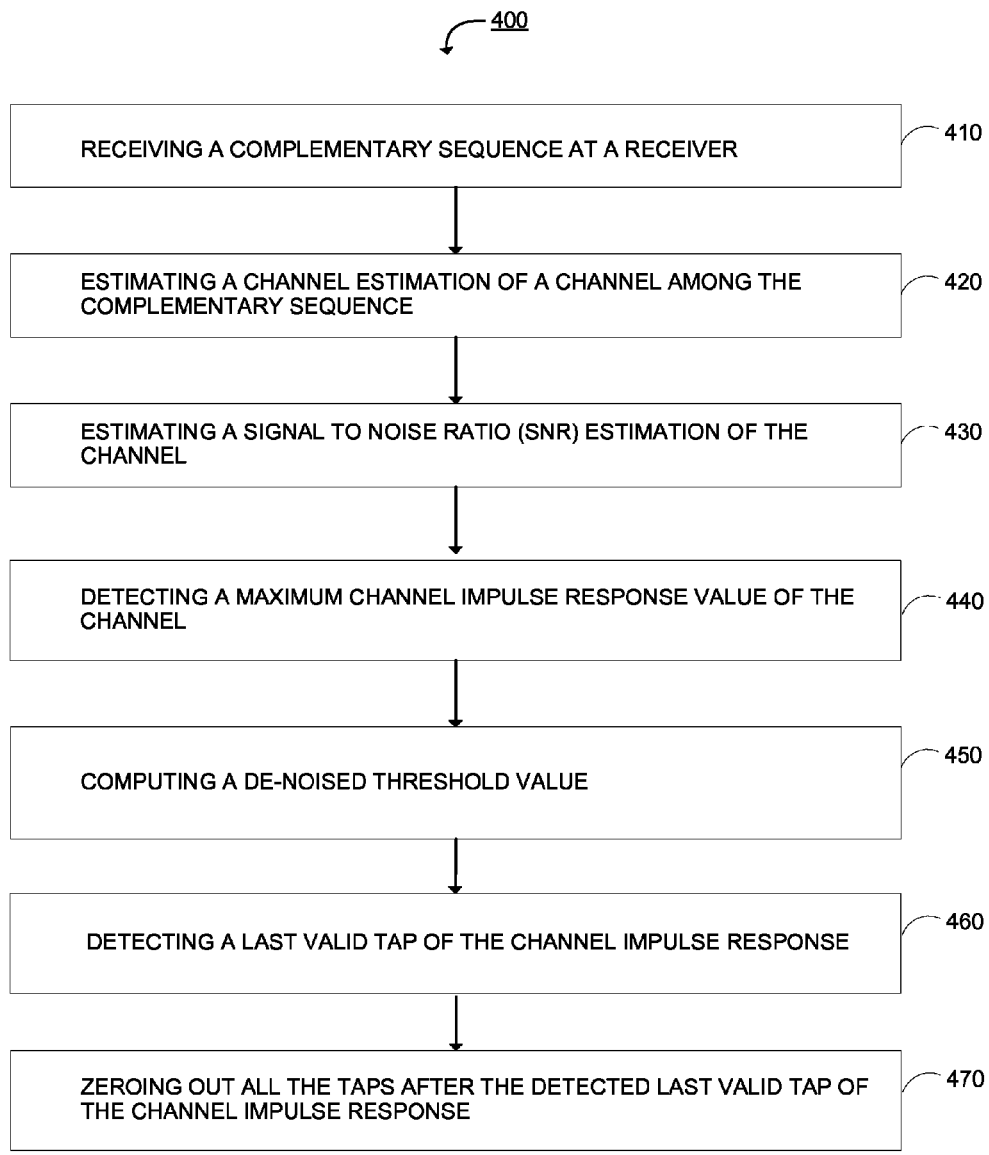
FIG. 4 is a flow diagram that illustrates the operation of a method for performing channel estimation in a millimeter wave wireless communication system.

FIG. 4 shows a flowchart 400 that illustrates the operation of a method for performing channel estimation in a millimeter wave wireless communication system according to one embodiment. In S410, a radio signal including complementary sequences is received at a receiver for each frame of a PLOP protocol data unit (PPDU). The radio signal is a millimeter-wave signal. In S420, a channel estimation of a single channel using a set of predefined complementary sequences is performed. The channel estimation is performed by cross correlation of the predefined complementary sequences with the radio signal related to the received complementary sequences. The process described above in S420 results in the channel estimation.

In S430, a signal-to-noise ratio (SNR) of the channel is estimated. In one embodiment, the SNR estimate of the channel is estimated by subtracting two subsequent preambles (e.g., subscription of the short training field). In another embodiment, the SNR estimate of the channel is estimated based on the strength of the received radio signal and using the estimated channel. In S440, a maximum channel response value of the channel estimation is detected. Various techniques for detecting the maximum channel response value are discussed above.

In S450, a de-noised threshold value of the channel for use in detecting a last valid tap of the channel impulse response value is computed. In an embodiment, the de-noised threshold value is computed using either Equation No. 2 or Equation No. 3 described above. In S460, a last valid tap is detected. In an embodiment, this is performed by comparing the de-noised threshold value to the channel estimation. The last tap of the channel estimation that has a value equal to or less than that of the de-noised threshold value is considered the last valid tap. In S470, the method then zeroes-out all the taps after the detected last valid tap of the channel impulse response.

In one embodiment, the channel has a delay spread shorter than a maximum channel response value.

In another example embodiment, the complementary sequences are Golay complementary sequences.

In yet another example embodiment, the method further comprises detecting a delay spread among the Golay complementary sequences and determining the presence of noise (or lack thereof).

In another example embodiment, the threshold value and maximal channel response value are set to the various channel behavioral limits in accordance with operating classes in various regions of the world and operating environments.

In one example embodiment, the SNR estimator is configured to estimate the SNR estimation of the channel by subtracting two subsequent IEEE 802.11ad preambles.

In another alternative embodiment, the SNR estimator is configured to estimate the SNR estimation of the channel based on the strength of the received signal and the estimated channel.

In yet another example embodiment, a maximum last tap value of the channel response, max(ilast), is such that an absolute value of a channel response sequence h is subject to zeroing out all taps following the last tap value i not greater than the SNR estimation of the channel multiplied by a threshold noise value.

The various disclosed embodiments can be implemented as hardware, firmware, software or any combination thereof. Moreover, the software is preferably implemented as an application program tangibly embodied on a program storage unit, a non-transitory computer readable medium, or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Also as used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a computer, laptop computer, a tablet or mobile phone or server, to perform various functions and (c) to circuits, such as a microprocessor(s) or a portion of a microprocessor(s), that require software or firmware for operation, even if the software or firmware is not physically presence. This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware.

What is claimed is:

1. A method for wireless communication, comprising:
   receiving complementary sequences;
   estimating a channel estimation of a channel based on the received complementary sequences;
   estimating a signal-to-noise ratio (SNR) estimation of the channel;
   detecting a maximum channel response of the channel estimation;
   computing a de-noised threshold based on the maximum channel response and the SNR estimation of the channel, wherein the de-noised threshold is computed by dividing the maximum channel response by the SNR estimation of the channel, and multiplying a resulting quotient by a threshold noise, wherein the threshold noise is representative of a known additive noise;
   comparing the de-noised threshold to the channel estimation to detect a last valid tap of a channel impulse response; and
   zeroing out one or more taps of the channel impulse response if the one or more taps are after the detected last valid tap of the channel impulse response.

2. The method of claim 1, wherein the complementary sequences are Golay complementary sequences.

3. The method of claim 1, wherein estimating the channel estimation further comprises:
   cross-correlating the received complementary sequences with a set of complementary sequences.

4. The method of claim 1, wherein the SNR estimation is estimated by subtracting two subsequent IEEE 802.11ad preambles.

5. The method of claim 1, wherein the SNR estimation is estimated based on the strength of the received complementary sequences and the channel estimation.

6. An apparatus for wireless communication, comprising:
   radio frequency (RF) circuitry configured to cause the apparatus to receive complementary sequences;
   baseband circuitry configured to cause the apparatus to:
     estimate a channel estimation of a channel based on the received complementary sequences;
     estimate a signal-to-noise ratio (SNR) estimation of the channel;
     detect a maximum channel response of the channel estimation;
     compute a de-noised threshold based on the maximum channel response and the SNR estimation of the channel, wherein the de-noised threshold is computed by dividing the maximum channel response by the SNR estimation of the channel, and multiplying a resulting quotient by a threshold noise, wherein the threshold noise is representative of a known additive noise;
     compare the de-noised threshold to the channel estimation to detect a last valid tap of a channel impulse response; and
     zero out one or more taps of the channel impulse response if the one or more taps are after the detected last valid tap of the channel impulse response.

7. The apparatus of claim 6, wherein the complementary sequences are Golay complementary sequences.

8. The apparatus of claim 6, wherein the baseband circuitry is further configured to:
   cross-correlate the received complementary sequences with a predefined set of complementary sequences.

9. The apparatus of claim 6, further comprising a receiver configured to receive the complementary sequences, wherein the receiver is configured to operate at a 60 GHz frequency band in accordance with the IEEE 802.11ad standard.

10. The apparatus of claim 9, wherein the receiver is coupled to an electronic device configured to support applications which operate at the 60 GHz frequency band in compliance with the IEEE 802.11ad standard.

11. A computing device, comprising:
    an antenna;
    radio frequency (RF) circuitry configured to cause the apparatus to receive complementary sequences via the antenna; and baseband circuitry configured to cause the apparatus to:
  estimate a channel estimation of a channel based on the received complementary sequences;
  estimate a signal-to-noise ratio (SNR) estimation of the channel;
  detect a maximum channel response of the channel estimation;
  compute a de-noised threshold based on the maximum channel response and the SNR estimation of the channel, wherein the de-noised threshold is computed by dividing the maximum channel response by the SNR estimation of the channel, and multiplying a resulting quotient by a threshold noise, wherein the threshold noise is representative of a known additive noise;
  compare the de-noised threshold to the channel estimation to detect a last valid tap of a channel impulse response; and
  zero out one or more taps of the channel impulse response if the one or more taps are after the detected last valid tap of the channel impulse response.

\* \* \* \* \*